United States Patent

Düerwald et al.

Patent Number: 4,589,510
Date of Patent: May 20, 1986

[54] MULTIPLE WHEEL STEERING MECHANISM

[75] Inventors: Dierk Düerwald; Jürgen Cittrich, both of Wetter, Fed. Rep. of Germany

[73] Assignee: Mannesmann Aktiengesellschaft, Duesseldorf, Fed. Rep. of Germany

[21] Appl. No.: 627,454

[22] Filed: Jul. 3, 1984

[30] Foreign Application Priority Data

Jul. 9, 1983 [DE] Fed. Rep. of Germany ....... 3324862

[51] Int. Cl.⁴ .............................................. B62D 5/06
[52] U.S. Cl. ................................... 180/140; 180/211; 280/91; 280/98; 280/103
[58] Field of Search ........................... 280/91, 98, 103; 180/211, 140

[56] References Cited

U.S. PATENT DOCUMENTS

| | | | |
|---|---|---|---|
| 1,449,649 | 3/1923 | Brown | 180/211 |
| 2,812,191 | 11/1957 | Kersey, Jr. et al. | 280/91 |
| 3,110,352 | 11/1963 | McClarnen | 180/211 |
| 3,613,816 | 10/1971 | Gutbrod | 280/91 |
| 3,998,288 | 12/1976 | Aoki | 180/211 |
| 4,076,091 | 2/1978 | Forster | 180/211 |
| 4,105,086 | 8/1978 | Ishii et al. | 280/91 |
| 4,335,800 | 6/1982 | Arato | 280/91 |

FOREIGN PATENT DOCUMENTS

| | | | |
|---|---|---|---|
| 811546 | 7/1949 | Fed. Rep. of Germany | 280/91 |
| 2759094 | 6/1978 | Fed. Rep. of Germany | . |
| 99471 | 7/1980 | Japan | 280/91 |

Primary Examiner—Albert J. Makay
Assistant Examiner—Steven E. Warner
Attorney, Agent, or Firm—Ralf H. Siegemund

[57] ABSTRACT

A multiple wheel steering mechanism is disclosed, wherein a single front wheel by way of example is steerable directly and carries a sideways extending lever, connected by means of a rod to a lateral extension of an intermediate lever in the rear, the connection runs obliquely to the longitudinal axis of the vehicle and the intermediate lever and through steering rods and a lever mechanism is connected to individual journal mounts and bearing for the rear wheels, steering them in unison about separate vertical axes.

7 Claims, 3 Drawing Figures

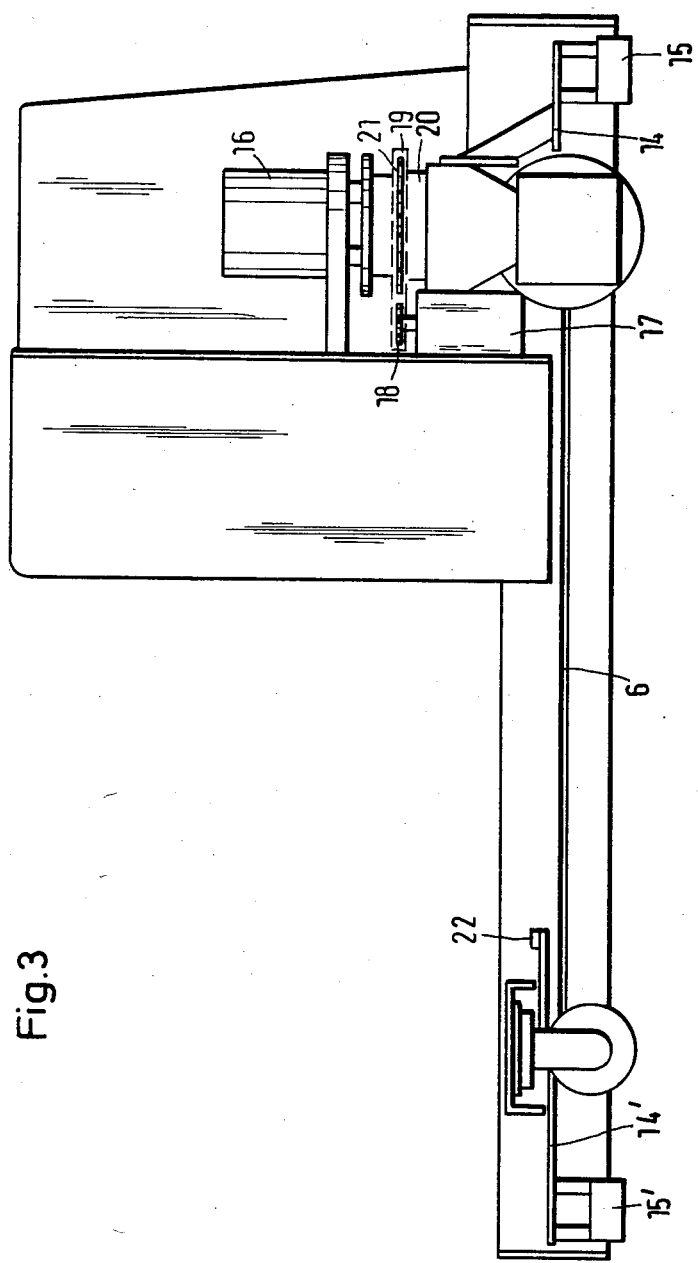

MULTIPLE WHEEL STEERING MECHANISM

BACKGROUND OF THE INVENTION

The present invention relates to steering of vehicles particularly for multiple wheel steering, wherein the wheels are interconnected through a rod and lever linkage mechanism for purposes of common swiveling.

German printed patent application No. 27 59 094, describes a steering mechanism by means of which several steering gears and toothed racks and rods are used in a rather complex arrangement, in order to obtain a four-wheel steering. The expense inherent in this known system is justifiable for expensive special type vehicles but not for simple transport vehicles, to be used as "work horses".

DESCRIPTION OF THE INVENTION

It is an object of the present invention to provide a new and improved multiple wheel steering mechanism and here particularly to provide a new and improved rod linkage for use in multiple wheel vehicle steering.

In accordance with the preferred embodiment of the present invention, it is suggested to provide an obliquely oriented lever or rod like linkage, which with one end, engages a steering lever of the front axle portion of the vehicle and extending to one side of the longitudinal center axis of the vehicle while engaging an intermediate lever at the rear axle and having a lateral extension to the other side of that longitudinal center axis, the latter intermediate lever is pivotable on the intersection of the rear axle with the aforementioned center line, and through rods and steering pins that intermediate lever is connected to bugies of the rear wheel. The longitudinal connection may either be a rod or a Bowden type cable with thrust bearings. Thus, with the exception of the particular intermediate lever, the entire steering mechanism is comprised exclusively of rods and pins of the variety that has been used literally by the millions in automobiles. But even the intermediate lever is, or can be made to be, relatively simple and therefore will not be considered a burden on manufacturers and users.

In furtherance of the invention, the steering lever at the front axle is as long as the laterally extending lever portion of the intermediate lever. The pivot and steering pin between the front axle steering lever and the longitudinal rod or connection, as well as the steering pin between the latter rod or connection and the lateral extension of the intermediate lever, are situated between the axles of the vehicle at an angle of about 75 degrees to the longitudinal center axis of the vehicle (for zero steering angle). The steering arms of the rear wheels extend from the rear axle in forward direction and are inclined by approximately 10 degrees to the longitudinal axis of the vehicle. This way one obtains an arrangement equivalent to the usual steering geometry of automobile in that a trapezoidally shaped quadrilateral is established and maintained, which considers wheel base and gage distance of the wheels to be steered.

If the vehicle has for example, a single front wheel and two twin rear wheels a particularly simple construction is available, particularly if the single front wheel is connected to the drive engine or motor, and steering motor is provided having a gear for a roller chain, which runs across a gear connected to the steering column or bogie for the front wheel axis. In the case of a remote controlled vehicle the front wheel steering mechanism may include a wagon pole like device being equipped with a signal receiving arrangement such as an automatic tracker to obtain the requisite steering operation. In cases, it may be desirable to permit the vehicle to run backwards. In this case the rear intermediate lever as established should have a rearwardly extending pole or arm, being also equipped with a signal device for tracking and control.

DESCRIPTION OF THE DRAWINGS

While the specification concludes with claims particularly pointing out and distinctly claiming the subject matter which is regarded as the invention, it is believed that the invention, the objects and features of the invention, and further objects, features and advantages thereof will be better understood from the following description taken in connection with the accompanying drawings in which:

FIG. 3 is a side elevation of the vehicle shown in FIG. 2.

Proceeding now to the detailed description of the drawings, FIGS. 1 and 2 illustrate a vehicle with a single front wheel and two twin or double rear wheels. The vehicle is assumed to have a longitudinal center axis or line 1! The front wheel 3 with a front axle 2 is journalled and mounted in a bogie 20 (FIG. 3), pivotable about a vertical axis 3a which is basically the point of intersection of the (undeflected) axis 2 and the longitudinal center axis 1.

Figure 1:
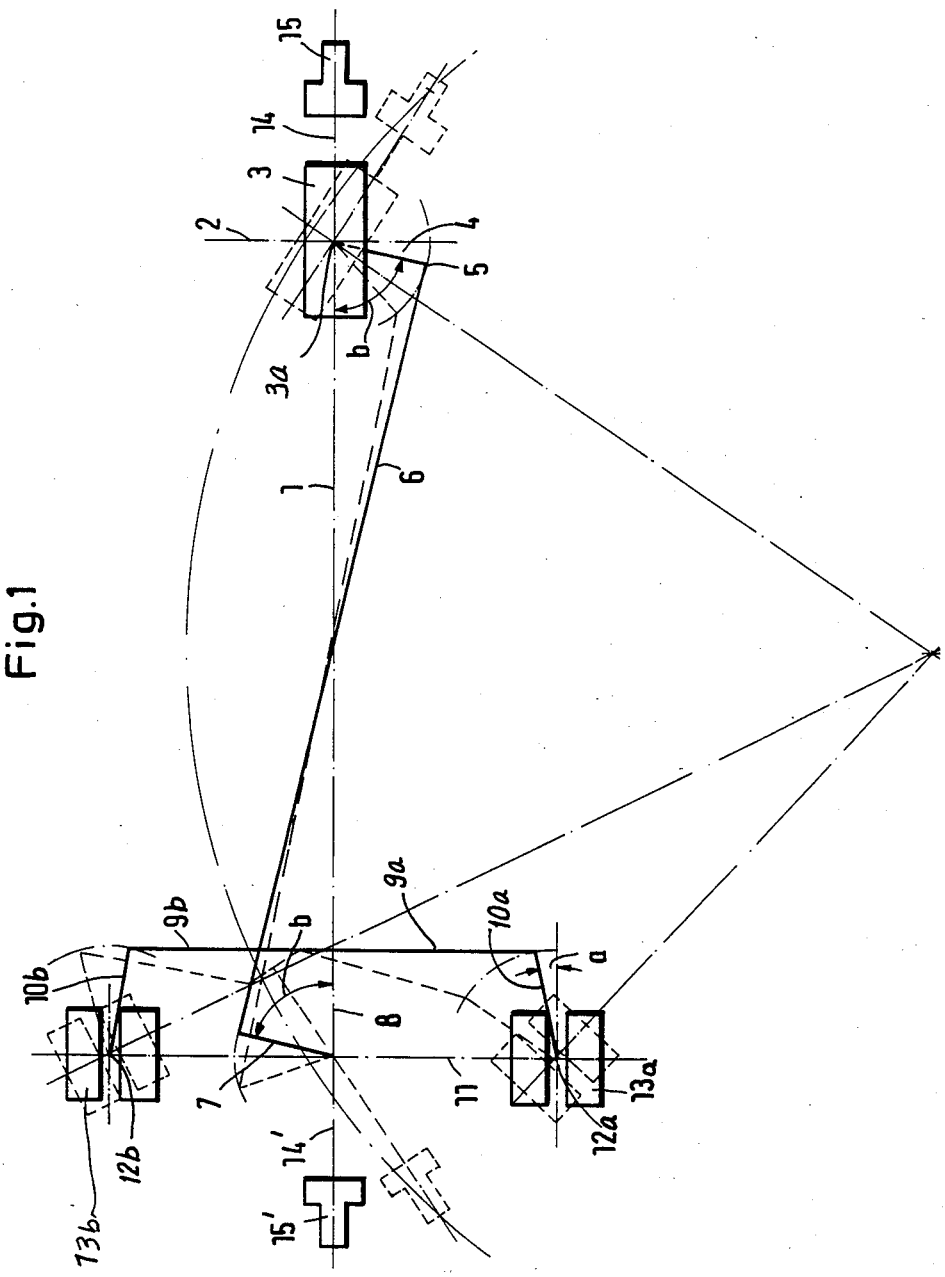
FIG. 1 is a somewhat schematic top plan of a steering mechanism for a three wheel vehicle in accordance with the preferred embodiment of the present invention for practicing the best mode thereof, the figure illustrates primarily the kinematics involved in steering.
Figure 2:
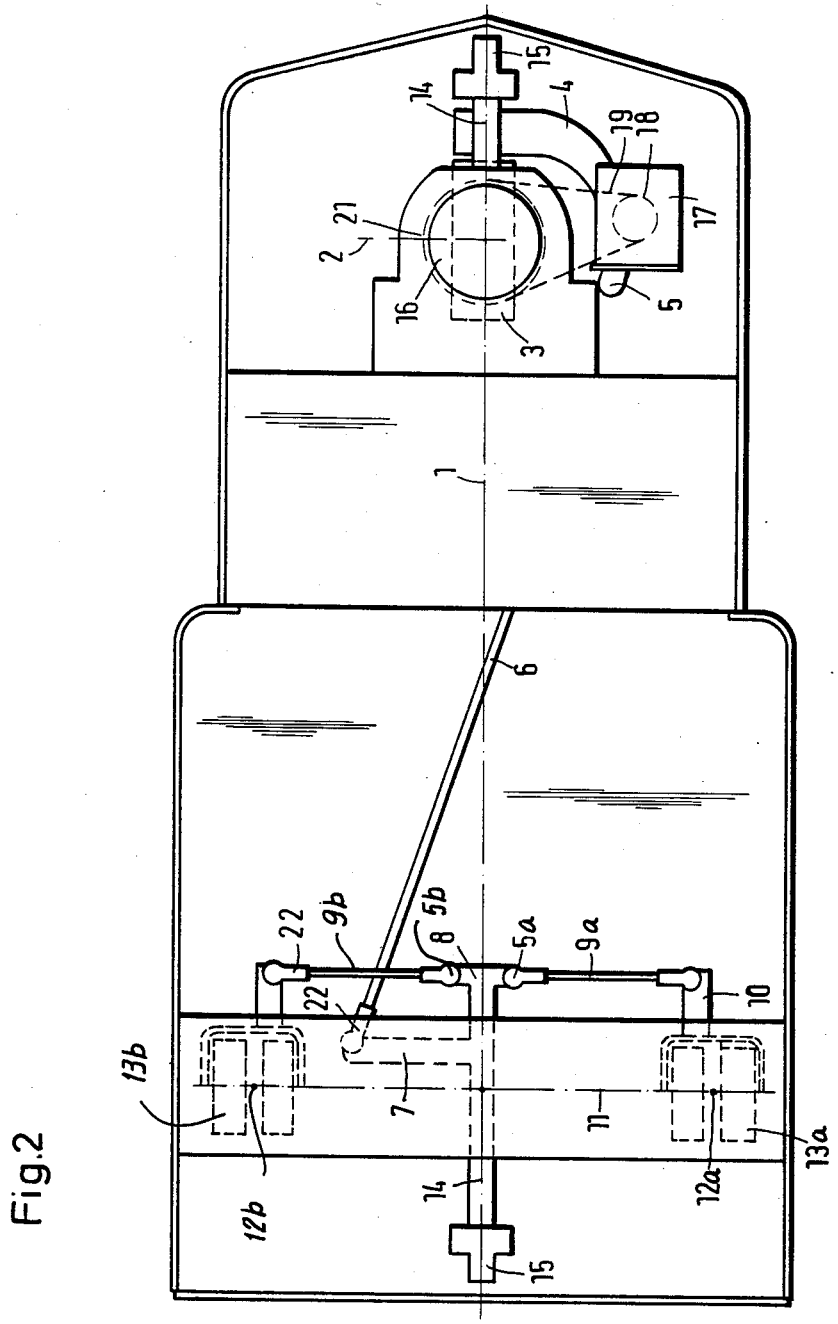
FIG. 2 shows a top plan of the same steering mechanism with greater emphasis on construction details.

As is schematically indicated in FIG. 1, but illustrated in greater detail in FIG. 2, there is a steering lever 4 provided which extends from the bogie 20 having a pole 14. This steering lever 5, is connected through a steering pin 5, to a longitudinal rod 6. If the bogie 20 turns, the lever 4, is shifted by the pole 14, and the displacement is transmitted upon the connecting rod 6 on account of pivoting and the pin 5 connected one end of rod 6 to steering lever 4. The latter pivots about the center of the intersection of the axis or axle 2 and longitudinal axis 1, as is shown particularly in FIG. 1, wherein the alternative positions for the lever 6 are shown in dashed lines, having validity for a steering deflection of the wheel 3, likewise as indicated in dashed lines in FIG. 1.

Reference numeral 16 refers to the drive engine or motor of the vehicle being connected to the front wheel 3 in the usual manner. Reference numeral 17, refers to the steering motor or engine having a drive gear 18, engaging a transmission roller chain 19. The chain 19 in turn loops partially around a gear 21 which is provided for turning the bogie 20. This then constitutes the primary steering motor.

The arm or pole 14 carries a signal receiving device, providing for example for on line track and issuing signals to the motor 16 so that automatic steering is obtained.

The front wheel steering motion is as stated transmitted to the rear assembly by the rod and connection 6. The vehicle has in the rear two pairs of wheels 13a and 13b, with basically a common rear axis 11, for zero steering angle. Each of the wheel pairs is held in bogie and can thus be rotated, and pivoted or swivelled respectively about vertical axis 12a and 12b, extending transversely to the plane of the drawing of FIG. 2.

In order to obtain common steering motion an intermediate lever 8 is provided and pivoted about a pivot point 8a. The lever 8 has a lateral extension 7, the end of which is connected through an adjustable connection 22, to the other end of the rod 6. It can readily be seen that the lateral extension 7 of intermediate lever 8 connects to one side of the longitudinal center axis 1 of the vehicle and the front wheel steering lever 4 extends in the opposite direction, so that as illustrated the rod 6 has an oblique position in relation to the longitudinal axis 1.

The extension 7 is about as long as the end of lever 4 is spaced from center line 1. Moreover, the radial line from swivel point 3a, to the pivot linkage between lever 4 and rod 6 has an angle b of 75 degrees to axis 1. Analogous, the same angle b extends between axis 1 and the radial line from pivot 8b to the linking point between lever 7 and rod 6.

The intermediate lever 8 moreover is provided with steering pins 5a and 5b being offset to both side of the longitudinal axis 1. There are two such steering pins accordingly and they connect to steering rods 9a and 9b, which in turn are connected through additional steering pins with steering levers 10a and 10b. These steering levers 10a and 10b engage the journal mount and bearing constructions, e.g. bogies for the two sets of wheels, as stated they are additionally journaled for pivoting about the two vertical axes 12a and 12b. The two levers 10a and 10b accordingly provide for that pivot motion to pivot and steer the rear wheel pairs 13a and 13b. The levers 10a, 10b extend generally in forward direction but at an angle a of about 10 degrees towards axis 1. The lever 8 has a rearward extension 14' which is also provided with a signal receiving device 15' in order o permit remote control.

In order to accurately adjust the steering levers 10a and 10b to an angle a each of the steering rods are provided with a follower device 22. The longitudinal 6 is likewise provided with a follower structure 22 for purposes of adjusting the angle b between the longitudinal axes and line 1 and the respective connections to the steering lever on one hand and the latter lever extension 7 on the other hand.

The kinematics of steering is readily discernible from FIG. 1 wherein the several wheels are adjusted to undergo a certain curved path of travel. The dash-dot lines illustrate the various elements otherwise drawn in solid lines but now in the adjusted position for steering.

The invention is not limited to the embodiments described above, but all changes and modifications thereof not constituting departures from the spirit and scope of the invention, are intended to be included.

We claim:

1. A multiple wheel steering device, there being a front axle for at least one wheel, and a rear axle for at least two wheels, the vehicle having a longitudinal center axis, comprising:

a steering lever operatively connected to the front axle for turning the front wheel or wheels about a vertical axis on and through said center axis, the lever extending to and remaining on one side of said longitudinal center axis;

a first pole extending generally forward from said steering lever;

first signal receiving device on said pole;

an intermediate lever provided for pivot motion about a vertical axis on and through the longitudinal axis of the vehicle and having a lateral lever extension extending to and remaining on a side opposite the side of said first steering lever;

a second pole extensing generally rearward from the intermedaite lever;

a second signal receiving device on said second pole;

a single rod for interconnecting at an oblique angle to the longitudinal center axis, said steering lever and said lateral lever extension;

additional lever means for connecting said intermediate lever to individual journal mounts for said rear wheels for pivoting the mounts individually on vertical axes, upon pivoting of said intermediate lever by operating of said oblique connection;

a steering motor connected to the signal receiving devices and to the front wheels for steering the vehicle on forward and reverse motion, there being no separate steering motion for the rear wheels; and a front wheel drive connected to the front axle, there being no additional drive for the wheels on the rear axles.

2. Steering mechanism as in claim 1, wherein additional steering levers one for each of the rear wheels are provided and being inclined by about 10 degrees to said longitudinal center axis, and being respectively connected by means of steering rods to said intermediate lever, the latter steering levers and rods constituting said additional lever means.

3. Steering mechanism as in claim 1, including the steering motor, a drive gear, and transmission chain connected thereto and a gear for a bogie all connected for steering the front axle.

4. Steering mechanism as in claim 1, said vehicle having a single front wheel and two pairs of said rear wheels.

5. The steering mechanism as in claim 1, said steering lever being as long as said lateral lever extension in relation to said longitudinal center axis.

6. Steering mechanism as in claim 5, wherein a connect point of said connection to said lateral extension is offset by 75 degrees to the longitudinal center axis.

7. Steering mechanism as in claim 5, wherein the connect point between the steering lever and the connection is offset by about 75 degrees to the longitudinal center axis.

* * * * *